Jan. 21, 1947. J. A. WILDERMUTH 2,414,623
HEATING SYSTEM
Filed May 12, 1941 2 Sheets-Sheet 2

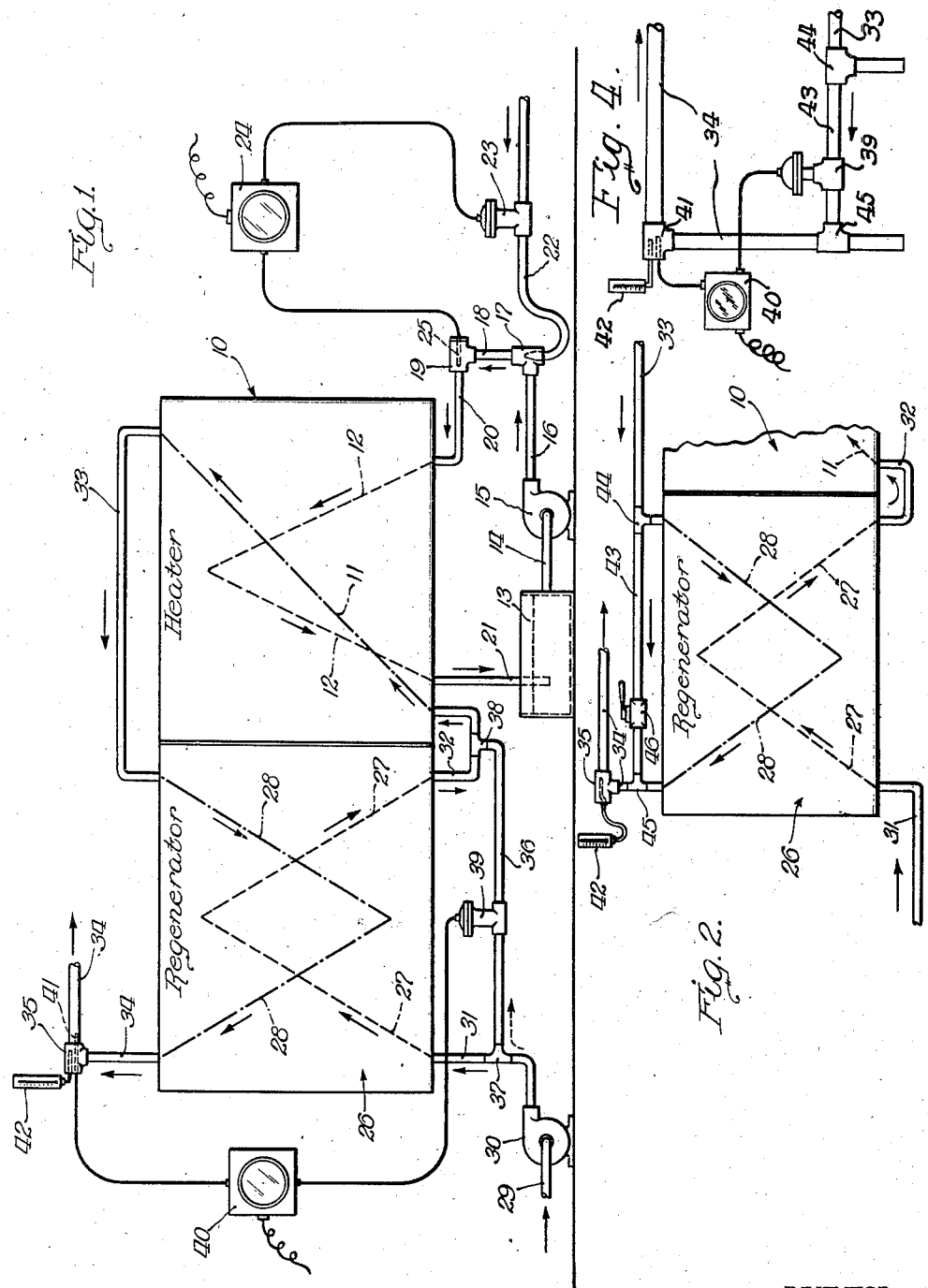

INVENTOR.
James A. Wildermuth
BY

Patented Jan. 21, 1947

2,414,623

UNITED STATES PATENT OFFICE 2,414,623

HEATING SYSTEM

James A. Wildermuth, Little Falls, N. Y., assignor to Cherry-Burrell Corporation, Wilmington, Del., a corporation Application May 12, 1941, Serial No. 393,033

8 Claims. (Cl. 257—2)

1

This invention relates to heat exchangers such as are used for the attempering or pasteurization of fluids. The invention is particularly useful in the attempering of fluids, such as milk, incidental to the preheating thereof prior to separation and the attempering of milk incidental to the pasteurization thereof for cheese-making.

In describing the instant invention, though it may be adaptable for the treatment of other fluids, the preferred and illustrated embodiments and modifications thereof will be disclosed with particular reference to the use of this invention in connection with the processing of milk for the purposes referred to above.

In milk treating plants it is the normal procedure to first treat the milk which has been stored in refrigerated storage tanks and then subsequently to treat such additionally desired quantities of milk as may have been received from centralizing stations, etc., and which normally are of a higher temperature than the milk which has been stored in refrigerated storage tanks. The usual procedure in the treatment of milk, as just referred to, involves the processing of different quantities of milk which may vary as much as 20° to 30° in temperature.

It is common practice, in order to provide the additional heating capacity required to treat the milk of lowest temperature, to use a separate attempering or preliminary heating unit or section since the main treating unit or heat exchanger is normally of such a capacity as to be capable of treating the larger proportion of the milk which is usually at the higher temperature. Such additional equipment required to enable the proper treatment of all of the milk, including the milk of low temperature, obviously involves increased cost and introduces numerous inconveniences incidental to the operation of the extra equipment.

It is the prime object of this invention to provide an efficient and satisfactory apparatus for heating fluids, such as milk, in which a predetermined final temperature of the heated fluid may be obtained and maintained by the use of a heat exchanger of a given capacity capable of satisfactorily treating the fluid when supplied to it at substantially varying temperatures, such, for example, as variations of from 20° to 30°.

A further object of this invention is to provide a fluid heat exchange device, including a heating unit and a regenerative unit, for the efficient pasteurization of fluids, such as milk, intended for use in the making of cheese in which the pasteurized milk is precooled in the regenerator by preheating the milk to be pasteurized, and in which the heat exchange device is adapted to continuously and at a uniform rate receive the milk to be pasteurized at greatly varying temperatures and yet continuously deliver the pasteurized and precooled milk at a predetermined temperature and at a uniform rate without involving the use of additional attempering or preliminary heating units or a heat exchanger, the capacity of which must be changed to accommodate the treatment of fluids of greatly varying temperatures.

A still further object of this invention is to provide means for automatically regulating the temperature and fluid flow conditions in the heat exchange device.

The foregoing objects and other important features which it is desired to cover by Letters Patent will be apparent as the nature of the invention is described in connection with the respective embodiments thereof as illustrated. The organization and operation of the elements of the invention as set forth in the following description may be more readily understood by reference to the drawings in which:

Figure 1 is a diagrammatic view of a heating apparatus comprised primarily of enclosed fluid passages and having incorporated therein an automatic by-pass arrangement associated with a novel temperature regulating arrangement.

Figure 2 is a diagrammatic view similar to a portion of Figure 1, showing a modified fluid by-pass arrangement.

Figure 4 is a diagrammatic view similar to the upper portion of Figure 2, showing a modified fluid by-pass arrangement provided with an automatic control.

Figure 3:
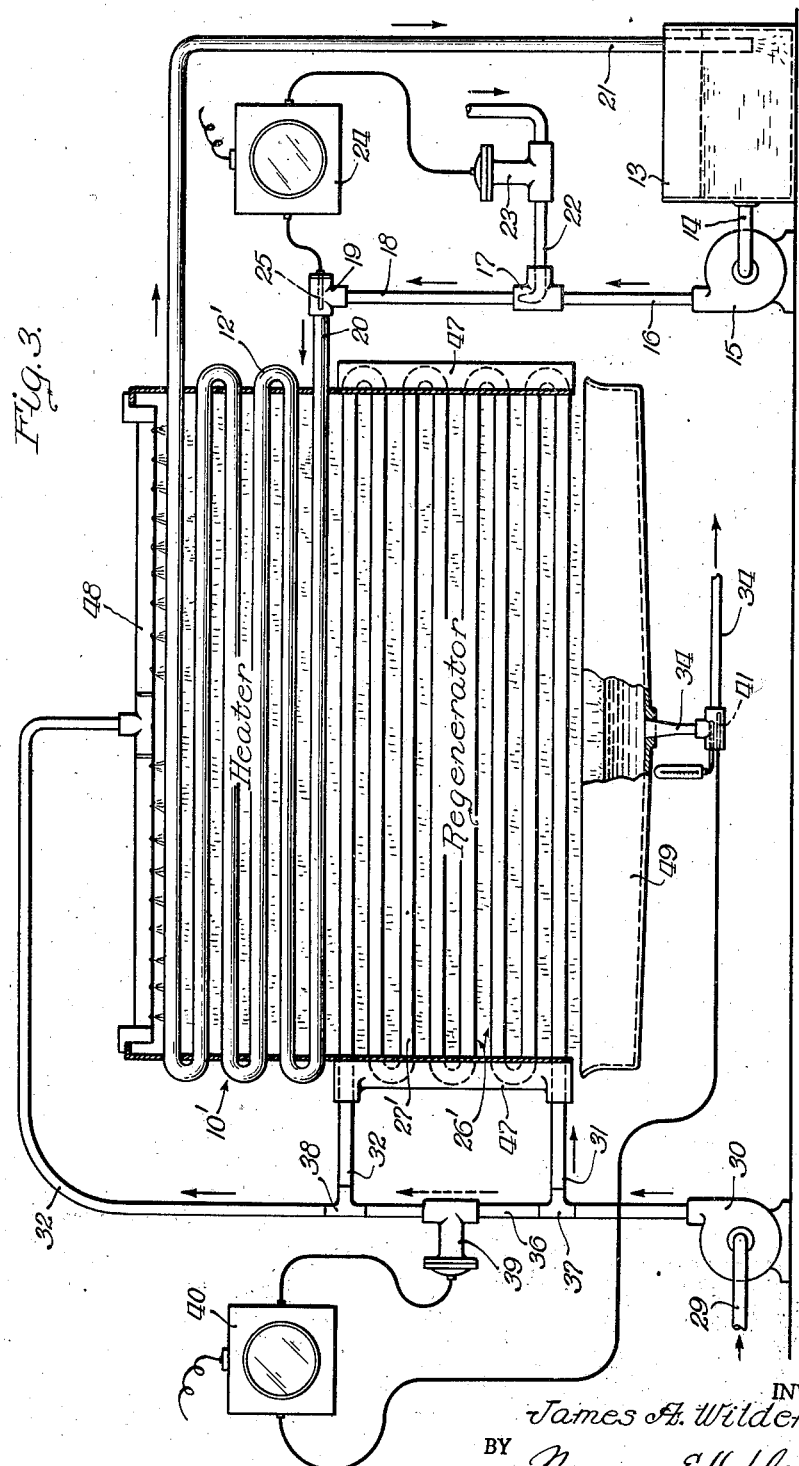
Figure 3 is a diagrammatic view of a surface type heater and regenerator to which the novel temperature regulating arrangement has been adapted.

Referring to the drawings, in which like elements are identified by like symbols, and referring particularly to Figures 1 and 2, the numeral 10 represents generally a plate type heater or pasteurizer of conventional construction in which a series of juxtaposed plates provide independent fluid passages schematically illustrated by the lines 11 and 12, through which passages milk or other fluid to be heated and heated water may flow, respectively, in heat exchange relation.

The illustrated preferred embodiments of the present invention, though they may also be used for the processing of other fluids, are particularly adapted for the processing of milk and the description will be particularly directed to such milk processing devices.

The heated water is supplied to the heater 10 from the sump or supply tank 13 through the pump suction pipe 14, pump 15 (the drive for which is not shown), pump discharge pipe 16, steam injecting T 17, conduit 18, connecting fitting 19, and conduit 20, from which latter conduit the hot water passes into the hot water passage 12 of the heater 10. The heating medium or hot water is discharged from the heater 10 into the sump 13 through conduit 21.

Steam is injected into the water through the steam injection T 17 for the purpose of heating the water before it enters the passage 12 of the heater 10. The steam is supplied from any suitable source (not shown) through the conduit 22. The quantity of steam supplied to the hot water through the steam injection T 17 is regulated by the automatic valve 23 in conduit 22. The automatically actuated valve 23 is regulated in the conventional manner by a conventional control unit 24 responsive to a thermal unit 25 placed in the hot water supply line at connecting fitting 19. In the hot water system as just described the hot water is recirculated through the circuit as aforementioned and the temperature of the water thereby before entering the passage 12 is raised to the desired and necessary predetermined temperature in the method as set forth to provide the necessary heating capacity.

The regenerative heat exchanger indicated generally by the numeral 26 and which is operated in conjunction with the heater 10 comprises a conventional plate type heater in which the juxtaposed plates (not shown) form independent fluid passages 27 and 28 for the regenerative flow of the milk to be heated and the heated milk, respectively.

The milk or other fluid to be heated is continuously withdrawn at a uniform rate from any suitable supply (not shown) through conduit 29 by constant capacity pump 30 which then discharges all or part of the milk into the regenerative passage 27 through pipe 31. The preheated milk is discharged from the preheating passage 27 through connecting conduit 32 from the regenerator 26 into the passage 11 of the heater 10. The heated milk is continuously discharged at a uniform rate from the heater 10 into conduit 33 from which, as shown in Figure 1, all of the milk passes into the precooling passage 28 of the regenerator 26. The completely treated fluid or milk is discharged from the precooling passage 28 through the conduit 34 which includes the connecting fitting 35.

The by-pass conduit 36, in the embodiment of the invention shown in Figure 1, is provided for by-passing some of the unheated milk directly from the supply conduit 31 to the conduit 32 which connects the regenerator with the heater, thereby preventing the by-passed milk from passing through the regenerative preheating passage 27. Conduit 36 communicates with the conduits 31 and 32 in any conventional manner as by connecting T's 37 and 38, respectively.

An automatic valve 39 of variable capacity is included in the by-pass conduit 36 to regulate the quantity of fluid flowing therethrough, thus quantitatively regulating the proportionate flow of fluids in heat exchange relation within the regenerator 26. The valve 39 is controlled in the conventional manner by a regulator 40 responsive to a thermal unit 41 positioned in the connecting fitting 35 of the treated fluid discharge conduit 34.

The heated milk flowing through the regenerative passage 28 will, as a result of the adjustment of the valve 39, be precooled to only the desired predetermined temperature by regulating the quantity of unheated milk flowing in the regenerative passage 27 in regenerative heat exchange relation with the heated milk in passage 28. Any excess of unheated milk is by-passed directly from the supply conduit 31 through by-pass 36 to the heater 10. Obviously the valve 39, which is shown as an automatic valve, may be replaced by a manually operable valve, the adjustment of which may be determined by observing the thermometer 42 indicating the temperature of the completely treated fluid flowing continuously at a uniform rate through the discharge pipe 34. Thermometer 42 is arranged in a conventional manner so as to denote the temperature of the completely treated fluid.

A modified arrangement of the fluid heat exchanger, which is revealed more completely in Figure 1, is shown in Figure 2. Only that portion of the improved device in which the modifications have been made is illustrated in Figure 2. The modification consists primarily of the deletion of the by-pass 36 disclosed in Figure 1 and the addition of a by-pass 43 between the heated liquid conduit 33 and the completely treated liquid discharge conduit 34. Conduit 43 is joined to the conduit 33 by T 44 and to the conduit 34 by T 45 positioned immediately ahead of the fitting 35.

A manually adjustable valve 46 is provided in the conduit 33 to regulate the flow of the heated liquid through the by-pass 43. The adjustment of the valve 46, which functions similarly to the valve 39 in regulating the proportionate flow of fluids in the regenerator 26, is determined by observing the temperature of the completely treated fluid being discharged through the passage 34, as indicated by the thermometer 42.

According to the above description of the modified arrangement illustrated in Figure 2, the final predetermined temperature of the completely processed milk is secured by reheating the heated but precooled milk which flows through the passage 28 of the regenerator 26, which reheating is accomplished by intermingling with such precooled milk some of the heated but unprecooled milk flowing directly from the heated milk passage 33 through the by-pass 43 into the final discharge conduit 44.

A further modified arrangement of the fluid heat exchanger, which is revealed more completely in Figure 1 and in slightly modified form in Figure 2, is shown in Figure 4. Only that portion of the improved device in which the modification over and above that shown in Figure 2 has been made is illustrated in Figure 4.

In Figure 4 an automatically actuatable valve 39 has been incorporated in the by-pass 43. The automatic valve 39 is the feature which distinguishes the by-pass system shown in Figure 2 from that shown in Figure 4. The valve 39 of Figure 4 is automatically actuated in response to a thermal unit 41 through a regulator 40 in the same general manner as described with respect to the apparatus shown in Figure 1 of the drawings.

The modified arrangement shown in Figure 3 operates in most respects similarly to the arrangement disclosed in Figure 1 with the exception that in the modification set forth in Figure 3, which is a surface type heater and regenerator, the milk to be heated and the milk after being heated flows continuously and at a uniform rate over the surface of the heater and the surface of the regenerator in a thin unconfined film. As previously pointed out, in the embodiment of the invention illustrated in Figure 1, the fluids flow through the heater and regenerator in confining passages. The hot water circulating system in Figure 3 is in substance the same as the hot water circulating system disclosed in Figure 1 with the exception that the heating coils 12' of the heater 10' through which the hot water flows are so arranged that the heated liquid may trickle down over the outer surface by a gravitational flow. The regenerator 26' of Figure 3 comprises a coil type heater positioned immediately below the heater 10' and is provided with the conventional removable end headers 47 to permit the cleaning of the interior of the tubes through which the unheated milk passes in regenerative heat exchange relation with the heated milk flowing over the outer surface of the tubes 27'.

The milk supply, in the arrangement shown in Figure 3, is drawn continuously and at a uniform rate into the constant capacity pump 30 through conduit 29 and all or a portion of the milk may be supplied to the interior of the regenerative coils 27' of the heater 26' through the conduit 31 and is discharged therefrom through the conduit 32. A by-pass 36, including an automatic valve 39, joins the conduits 31 and 32 by T's 37 and 38, respectively, whereby a portion of the milk to be heated may be by-passed around the regenerator 26' into the connecting conduit 32 directly from the supply conduit 31. This arrangement of connecting conduits, by-passes and control valves is similar to that described in detail with respect to Figure 1.

The preheated liquid in the conduit 32 of Figure 3 is supplied to the distributor 48 positioned above the heater 10' for distribution in a thin film on the upper surface of the heater coil 12'. The preheated liquid continuously supplied at a uniform rate is distributed by the distributor 48 and gravitationally flows over the coil 12' of the heater 10' onto the outer surface of the coils 27' of the regenerator 26', there to be precooled after passing over the heater 10'.

The precooled liquid is discharged from the regenerator 26' into a collecting trough 49 from which it is drained into the treated liquid discharge conduit 34. The regulation of the valve 39 of Figure 3 is accomplished by the control 40 which is responsive to the thermal unit 41 positioned in the treated liquid discharge 34 similarly to the arrangement shown in Figure 1.

According to the preferred and modified embodiments of the present invention, as just described, a unique and novel arrangement for the efficient and satisfactory heating of fluid has been provided in which a predetermined final temperature of the heated fluid may be obtained and maintained by the use of a heat exchanger of a given capacity in which the supply of liquid to be heated may vary in temperature very substantially.

Although only the preferred and two modified embodiments of the present invention have been described, further obvious modifications may become apparent to those skilled in the art upon examining the foregoing description of the illustrated embodiments of the invention. The invention is, however, not to be limited to the particular embodiments disclosed.

The invention is hereby claimed as follows:

1. A heat exchange system comprising, in combination, a heating unit provided with means to effect heat exchange between a fluid to be heated and a heating fluid, a regenerative heating unit provided with means for effecting heat exchange between a fluid to be heated and a heated fluid, fluid supply means for supplying fluid to be heated to said regenerative heating unit, means for withdrawing the fluid to be heated from said regenerative heating unit and supplying it to said heating unit, means for supplying heating fluid to said heating unit, means for withdrawing the heating fluid from said heating unit, means for controlling the temperature of the heating fluid supplied to said heating unit, fluid withdrawing means for withdrawing the heated fluid from said heating unit, means for supplying the heated fluid withdrawn from said heating unit to said regenerative heating unit, means for withdrawing the heated fluid from said regenerative heating unit, and variable capacity fluid conducting means for directly conducting from said fluid withdrawing means to said means for withdrawing the heated fluid from said regenerative heating unit some of the heated fluid.

2. A heat exchange system comprising, in combination, a heating unit provided with means to effect heat exchange between a fluid to be heated and a heating fluid, a regenerative heating unit provided with means for effecting heat exchange between a fluid to be heated and a heated fluid, fluid supply means for supplying fluid to be heated to said regenerative heating unit, means for withdrawing fluid to be heated from said regenerative heating unit and supplying it to said heating unit, means for supplying heating fluid to said heating unit, means for withdrawing the heating fluid from said heating unit, means for controlling the temperature of the heating fluid supplied to said heating unit, fluid withdrawing means through which heated fluid is continuously withdrawn from said heating unit at a uniform rate, means for supplying heated fluid withdrawn from said heating unit to said regenerative heating unit, means for withdrawing heated fluid from said regenerative heating unit, and variable capacity fluid conducting means for directly conducting from said fluid supply means to said heating unit some of the fluid to be heated, said variable capactiy means being automatically actuated in response to the temperature of the completely treated fluid discharged from said system.

3. A heat exchange system comprising, in combination, a heating unit provided with means to effect heat exchange between a fluid to be heated and a heating fluid, a regenerative heating unit provided with means for effecting heat exchange between a fluid to be heated and a heated fluid, fluid supply means for supplying fluid to be heated to said regenerative heating unit, means for withdrawing fluid to be heated from said regenerative heating unit and supplying it to said heating unit, means for supplying heating fluid to said heating unit, means for withdrawing heating fluid from said heating unit, means for controlling the temperature of the heating fluid supplied to said heating unit, fluid withdrawing means for withdrawing heated fluid from said heating unit, means for supplying heated fluid withdrawn from said heating unit to said regenerative heating unit, means for withdrawing heated fluid from said regenerative heating unit, and variable capactiy fluid conducting means for directly conducting from said fluid withdrawing means to said means for withdrawing heated fluid from said regenerative heating unit some of the heated fluid, said variable capacity means being automatically actuated in response to the temperature of the completely treated fluid discharged.

4. A heat exchange system comprising, in combination, a heating unit provided with means to effect heat exchange between a fluid to be heated and a heating fluid, a regenerative heating unit provided with means for effecting heat exchange between a fluid to be heated and a heated fluid, fluid supply means for supplying fluid to be heated to said regenerative heating unit, means for withdrawing fluid to be heated from said regenerative heating unit and supplying it to said heating unit, means for supplying heating fluid to said heating unit, means for withdrawing the heating fluid from said heating unit, means for controlling the temperature of the heating fluid supplied to said heating unit, fluid withdrawing means through which heated fluid is continuously withdrawn from said heating unit at a uniform rate, means for supplying heated fluid withdrawn from said heating unit to said regenerative heating unit, means for uninterruptedly withdrawing heated fluid from said regenerative heating unit, and variable capacity means for regulating quantitatively at least in part the flow of one of the fluids placed in heat exchange relation by said regenerative heating unit, whereby a predetermined uniform temperature is secured and maintained in said heated fluid discharged at a uniform rate from said system, said variable capacity means being automatically actuated in response to the temperature of the completely treated fluid discharged.

5. A heat exchange system comprising, in combination, a heating unit provided with means to effect heat exchange between a fluid to be heated and a heating fluid, a regenerative heating unit provided with means for effecting heat exchange between a fluid to be heated and a heated fluid, fluid supply means for supplying fluid to be heated to said regenerative heating unit, means for withdrawing fluid to be heated from said regenerative heating unit and supplying it to said heating unit, means for supplying heating fluid to said heating unit, means for withdrawing the heating fluid from said heating unit, means for controlling the temperature of the heating fluid supplied to said heating unit, fluid withdrawing means through which heated fluid is continuously withdrawn from said heating unit at a uniform rate, means for supplying heated fluid withdrawn from said heating unit to said regenerative heating unit, means for uninterruptedly withdrawing heated fluid from said regenerative heating unit, and variable capacity means for regulating quantitatively at least in part the flow of one of the fluids placed in heat exchange relation by said regenerative heating unit, whereby a predetermined uniform temperature is secured and maintained in said heated fluid discharged at a uniform rate from said system, said variable capacity means being automatically actuated in response to the temperature of the completely treated fluid discharged from said system and said means for controlling the temperature of the heating fluid being automatically actuated in response to the temperature of the heating fluid before it enters said heating unit.

6. A device of the class described comprising, in combination, regenerative heat exchange apparatus for preheating raw milk and precooling heated milk, constant capacity supply means for supplying milk to said regenerative apparatus to be preheated, a heating device to which the preheated milk is supplied, means for supplying the heated milk from said heating device to said regenerative device, and means including valve means responsive to the temperature of the heated milk withdrawn continuously from said device at a uniform rate, whereby raw milk may be supplied directly to said heating device from said supply means.

7. A heat exchange device for fluids comprising, in combination, a regenerative heat exchanger for preheating fluid, means for supplying fluid to be heated to said regenerative heat exchanger, a variable capacity fluid heating device to receive preheated fluid from the regenerative heat exchanger, means for conducting heated fluid from said heating device to said regenerative heat exchanger, and variable capacity means responsive to the temperature of the heated fluid continuously discharged at a uniform rate from said heat exchange device and adapted to regulate the proportionate relationship between the uninterrupted flow of fluids in regenerative heat exchange relation and the uninterrupted continuous flow of fluid to be heated by said heating device.

8. A method of regulating the temperature of a fluid discharged from a heat exchanger comprising the steps of preheating a portion of the fluid, primarily heating the fluid by heat exchange with a heating medium, controlling the degree of primary heating by the temperature of the heating medium, utilizing the heat retained by the fluid after the primary heating for effecting the preheating, by-passing a portion of the fluid during preheating in accordance with the temperature of the fluid discharged, and maintaining a uniform rate of fluid flow through the heat exchanger.

JAMES A. WILDERMUTH.